US006850929B2

(12) United States Patent  (10) Patent No.: US 6,850,929 B2
Chang et al.  (45) Date of Patent: Feb. 1, 2005

(54) SYSTEM AND METHOD FOR MANAGING FILE SYSTEM EXTENDED ATTRIBUTES

(75) Inventors: Joon Chang, Austin, TX (US); Amy Yi-mei Shi, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 626 days.

(21) Appl. No.: 09/801,605

(22) Filed: Mar. 8, 2001

(65) Prior Publication Data

US 2002/0129028 A1 Sep. 12, 2002

(51) Int. Cl.[7] ............................................... G06F 17/30
(52) U.S. Cl. ........................ 707/3; 707/102; 707/103 R
(58) Field of Search ...................... 707/3, 102, 103 R, 707/104.1, 200, 101, 205; 711/210, 3.5; 708/231; 345/531, 542, 543, 544, 551

(56) References Cited

U.S. PATENT DOCUMENTS 5,974,409 A * 10/1999 Sanu et al. .................... 707/3
6,006,312 A * 12/1999 Kohn et al. .................. 711/210
6,334,125 B1 * 12/2001 Johnson et al. ................ 707/3
2001/0000536 A1 * 4/2001 Tarin .......................... 707/102

* cited by examiner

Primary Examiner—Diane D. Mizrahi
(74) Attorney, Agent, or Firm—Van Leeuwen & Van Leeuwen; Joseph T. Van Leeuwen; Diana Roberts

(57) ABSTRACT

An extended attribute data page includes extended attribute information about a number of files. The page is divided into areas, each area corresponding to a different file. A given area is further divided into a number of lines containing information about the extended attribute data. Areas include bitmaps indicating available space in the data space and address information for addressing off-page data areas. A directory is included of data types stored in the data area, and additional lines store extended attribute data. The extended attribute directory maintains a list of data types currently stored and related information. Including availability information about each line along with addresses to areas storing extended attribute data enables the extended attribute manager to efficiently determine where to place extended attribute data, mark deleted lines as being available, retrieve data being requested by a process, and modify the contents of a given extended attribute data type.

18 Claims, 9 Drawing Sheets dinodex 1 inline page map upon initialization ⟵ 405

`11000000 11111111 11111111 11111111 11111111 11111111 11111111 11111111` dinodex 2 inline page map upon initialization ⟵ 410

`11111111 11000000 11111111 11111111 11111111 11111111 11111111 11111111` dinodex 3 inline page map upon initialization ⟵ 415

`11111111 11111111 11000000 11111111 11111111 11111111 11111111 11111111` dinodex 4 inline page map upon initialization ⟵ 420

`11111111 11111111 11111111 11000000 11111111 11111111 11111111 11111111` dinodex 5 inline page map upon initialization ⟵ 425

`11111111 11111111 11111111 11111111 11000000 11111111 11111111 11111111` dinodex 6 inline page map upon initialization ⟵ 430

`11111111 11111111 11111111 11111111 11111111 11000000 11111111 11111111` dinodex 7 inline page map upon initialization ⟵ 435

`11111111 11111111 11111111 11111111 11111111 11111111 11000000 11111111` dinodex 8 inline page map upon initialization ⟵ 440

`11111111 11111111 11111111 11111111 11111111 11111111 11111111 11000000`

⟵ 450

| outline extended attribute data - line 1 |
| --- |
| outline extended attribute data - line 2 |
| outline extended attribute data - line 3 |
| ⋮ |
| outline extended attribute data - line 64 | outline page map upon initialization

SYSTEM AND METHOD FOR MANAGING FILE SYSTEM EXTENDED ATTRIBUTES

RELATED APPLICATIONS

This application is related to the U.S. patent application Ser. No. 09/656,520, now U.S. Pat. No. 6,625,674 entitled "Implementation for Efficient Access of Extended Attribute Data," filed on Sep. 7, 2000 and having the same inventors and assignee as the present application

BACKGROUND OF THE INVENTION

1. Technical Field

The present invention relates managing extended file attributes. More particularly, the present invention relates to a system and method for arranging file attributes into areas and tracking used areas with bitmaps.

2. Description of the Related Art

Operating systems, such as the UNIX operating system, use a file system for managing files. UNIX uses a hierarchical directory structure for organizing and maintaining files. Access permissions correspond to files and directories. The UNIX operating system organizes files into directories which are stored in a hierarchical tree-type configuration. At the top of the tree is the root directory which is represented by a slash {/} character. The root directory contains one or more directories. These directories, in turn, may contain further directories containing user files and other system files.

The fundamental structure that the UNIX operating system uses to store information is the file. A file is a sequence of bytes. UNIX keeps track of files internally by assigning each file a unique identification number. These numbers, called I-node numbers, are used only within the UNIX kernel itself. While UNIX uses i-node numbers to refer to files, it allows users to identify each file by a user-assigned name. A file name can be any sequence of characters and can be up to fourteen characters long.

There are three types of files in the UNIX file system: (1) ordinary files, which may be executable programs, text, or other types of data used as input or produced as output from some operation; (2) directory files, which contain lists of files in directories outlined above; and (3) special files, which provide a standard method of accessing input/output devices.

Internally, a directory is a file that contains the names of ordinary files and other directories and the corresponding i-node numbers for the files. With the i-node number, UNIX can examine other internal tables to determine where the file is stored and make it accessible to the user. UNIX directories themselves have names, examples of which were provided above, and can be up to fourteen characters long.

UNIX maintains a great deal of information about the files that it manages. For each file, the file system keeps track of the file's size, location, ownership, security, type, creation time, modification time, and access time. All of this information is maintained automatically by the file system as the files are created and used. UNIX file systems reside on mass storage devices such as disk drives and disk arrays. UNIX organizes a disk into a sequence of blocks. These blocks are usually either 512 or 2048 bytes long. The contents of a file are stored in one or more blocks which may be widely scattered on the disk.

An ordinary file is addressed through the i-node structure. Each i-node is addressed by an index contained in an i-list. The i-list is generated based on the size of the file system, with larger file systems generally implying more files and, thus, larger i-lists. Each i-node contains thirteen 4-byte disk address elements. The direct i-node can contain up to ten block addresses. If the file is larger than this, then the eleventh address points to the first level indirect block. Addresses 12 and 13 are used for second level and third level indirect blocks, respectively, with the indirect addressing chain before the first data block growing by one level as each new address slot in the direct i-node is required.

In addition to the standard information maintained by the file system for a particular file, metadata, or extended attributes, about the file are often needed by an application that uses the file. Because extended attributes vary greatly, depending on the type of application and the type of metadata to be maintained, this information is typically stored outside the standard i-node attribute data area. For example, a word processing application may need to store information regarding the document, such as profile information entered by a user. While this information is not stored with the document file, it needs to be in a related storage area for efficient processing by the application. Traditionally, extended attributes are stored in specific fields that are allocated for the attributes. The fields may store the actual extended attribute data or may store a pointer to another storage area containing attribute data that will not fit in the allocated space.

One challenge found in traditional systems is that a fixed allocated space for the extended data limits the amount of data that can be stored. When more extended data is needed, a pointer is stored in the allocated space which points to a separate data stream. Updating data stored in a separate data stream is inefficient because the separate extended attribute data stream is reconstructed in response to a change in the size of the attribute data. A further challenge exists in retrieving summary information regarding the extended attributes. Summary information is gathered by analyzing each substring within the extended attribute data stream causing further file processing inefficiencies.

What is needed, therefore, is a way of efficiently adding, modifying, or deleting extended attribute data without needing to reconstruct complex data streams each time the extended attribute size is modified.

SUMMARY

It has been discovered that extended attribute data can be flexibly and efficiently handled using an improved structured data design. An extended attribute data page contains extended attribute information about a number of files. The page is divided into areas, each area corresponding to a different file. A given area is further divided into a number of lines containing information about the extended data. One line includes bitmaps and address information, another line includes a flexible directory of the different data types stored in the extended attribute data area, and additional lines are used to store extended attribute data.

The bitmaps include a bitmap for the data areas within the current page ("inline") as well as bitmaps for data areas stored off-page ("outline"). Each bit of the bitmap corresponds to a different line within an area used to store extended attribute data. When the bit is flagged (i.e., ="1") it signifies that the corresponding line is currently being used. If the bit is available (i.e., ="0") it signifies that the corresponding line is not being used and is available to store extended data. The addresses include the address for the current inline page as well as addresses for additional outline pages.

The extended attribute directory maintains a list of the data types currently stored as well as information, such as an offset and an actual length, regarding such extended attribute data types. Including availability information about each line along with addresses to areas storing extended attribute data enables the extended attribute data manager to efficiently determine where to place extended attribute data, mark deleted lines as being available, retrieve data being requested by a process, and modify the contents of a given extended attribute data type.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings. The use of the same reference symbols in different drawings indicates similar or identical items.

FIG. 4 is a set of inline page bitmaps upon initialization and a format for an outline extended attribute page;

DETAILED DESCRIPTION

The following is intended to provide a detailed description of an example of the invention and should not be taken to be limiting of the invention itself. Rather, any number of variations may fall within the scope of the invention which is defined in the claims following the description.

Figure 1:
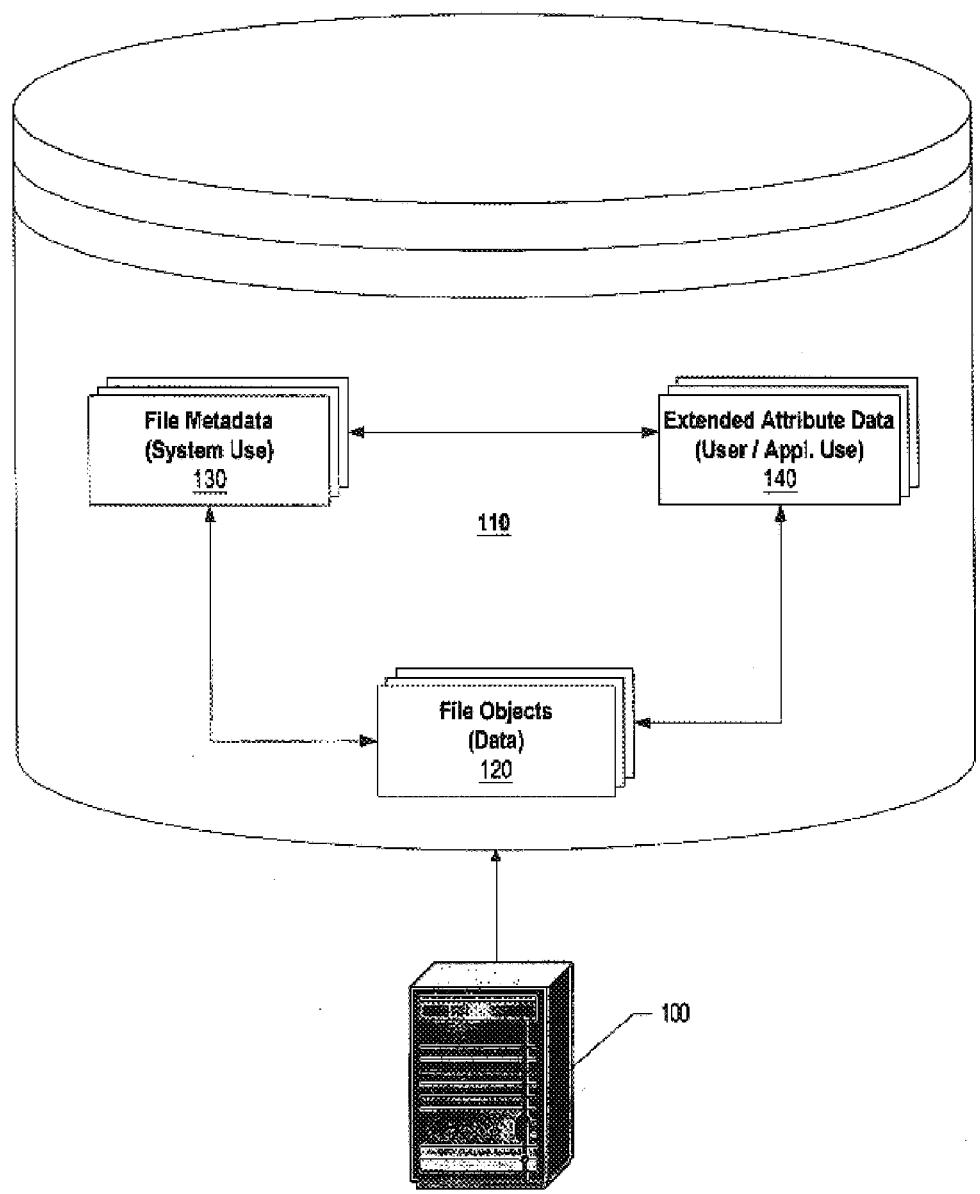
FIG. 1 is a high level diagram of a computer with a file system that includes extended attribute data.

FIG. 1 shows a high level diagram of a computer with a file system that includes extended attribute data. Computer system 100 includes an operating system for controlling the operation of the system. Part of the operating system includes a file system for managing nonvolatile storage, such as a disk drive, accessible by computer system 100. Nonvolatile storage device 110 is managed by the file system operating within computer system 100. The file system manages various components, or objects, relating to files stored on nonvolatile storage device 110. File objects 120 include data stored in files. For example, in a word processing application file objects 120 would store the data entered by the user, such as a report, article, or the like. File metadata 130 is maintained by the file system and includes system data regarding file objects 120. System maintained data included in file metadata 130 includes such things as the date and time file objects were last used, when they were created, the size of the file objects, security information pertaining to the file objects, and name and location of the file objects within nonvolatile storage device 110.

Extended attribute data 140 includes metadata pertaining to file objects that is maintained by the file system on behalf of the user or application program. Extended attribute data 140 includes application or user specific information pertaining to file objects 120. In the word processing example, extended attribute data 120 may include the title, author, manager, a read or write password, and other items that may pertain to a word processing file. Because of their application-specific nature, it is difficult to predict what fields and data will be included in extended attribute data for a particular file. For this reason, the extended attribute handler disclosed herein provides flexibility and efficiency when dealing with extended attributes.

Figure 2:
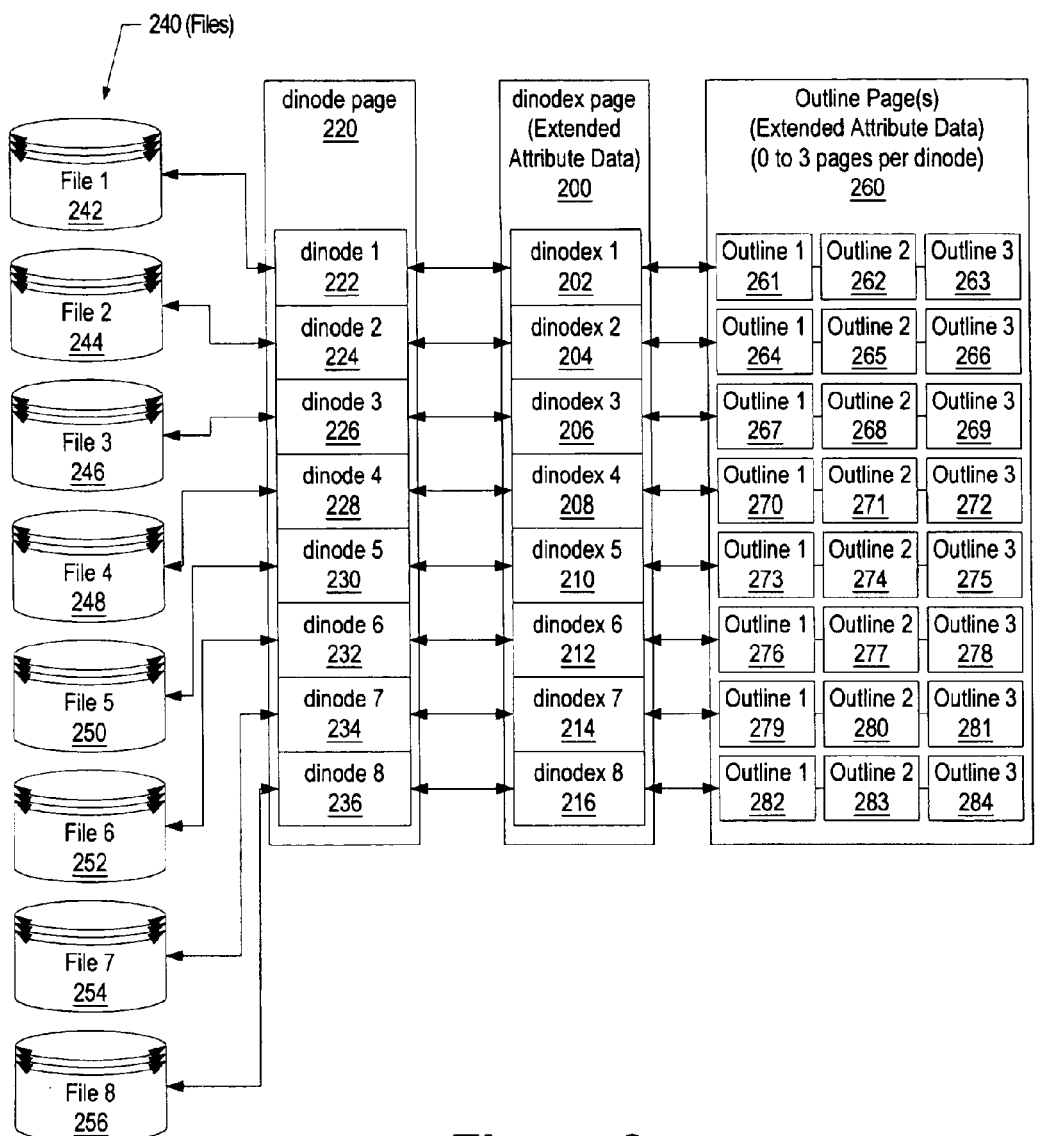
FIG. 2 is a block diagram of components included in providing extended attribute data.

FIG. 2 shows a block diagram of components included in providing extended attribute data. Extended attribute data is stored in dinodex page 200. Dinodex page 200 includes information relating to eight different files: dinodex 1 (202), dinodex 2 (204), dinodex 3 (206), dinodex 4 (208), dinodex 5 (210), dinodex 6 (212), dinodex 7 (214), and dinodex 8 (216). Each dinodex corresponds to a dinode from dinode page 220 and to 0 to 3 outline pages 260.

System metadata is stored in dinode page 220. Dinode page 220 includes information relating to eight files, each of the eight information areas corresponding with one of the dinodex data areas. File area 240 includes eight data files, each of which corresponds with a dinode and a dinodex data area. System data corresponding to file 1 (242) is stored in dinode 1 (222), while the corresponding extended attribute data is stored in dinodex 1 (202). If the extended attributes do not fit in the space available in dinodex 1 (202) (called the "inline" space), then additional outline pages (outline 1 (261), outline 2 (262), and outline 3 (263) are used to store extended attribute data in addition to the inline space available in dinodex 1 (202).

The following summarizes the remaining relationships between files, dinode data areas, dinodex data areas, and outline pages for the remaining seven files (files 2 through 8) shown in FIG. 2:

System data corresponding to file 2 (244) is stored in dinode 2 (224), while the corresponding extended attribute data is stored in dinodex 2 (204). If the extended attributes do not fit in the space available in dinodex 2 (204), then additional outline pages (outline 1 (264), outline 2 (265), and outline 3 (266) are used to store extended attribute data in addition to the inline space available in dinodex 2 (204).

System data corresponding to file 3 (246) is stored in dinode 3 (226), while the corresponding extended attribute data is stored in dinodex 3 (206). If the extended attributes do not fit in the space available in dinodex 3 (206), then additional outline pages (outline 1 (267), outline 2 (268), and outline 3 (269) are used to store extended attribute data in addition to the inline space available in dinodex 3 (206).

System data corresponding to file 4 (248) is stored in dinode 4 (228), while the corresponding extended attribute data is stored in dinodex 4 (208). If the extended attributes do not fit in the space available in dinodex 4 (208), then additional outline pages (outline 1 (270), outline 2 (271), and outline 3 (272) are used to store extended attribute data in addition to the inline space available in dinodex 4 (208).

System data corresponding to file 5 (250) is stored in dinode 5 (230), while the corresponding extended attribute data is stored in dinodex 5 (210). If the extended attributes do not fit in the space available in dinodex 5 (210), then additional outline pages (outline 1 (273), outline 2 (274), and outline 3 (275) are used to store extended attribute data in addition to the inline space available in dinodex 5 (210).

System data corresponding to file 6 (252) is stored in dinode 6 (232), while the corresponding extended attribute data is stored in dinodex 6 (212). If the extended attributes do not fit in the space available in dinodex 6 (212), then additional outline pages (outline 1 (276), outline 2 (277), and outline 3 (278) are used to store extended attribute data in addition to the inline space available in dinodex 6 (212).

System data corresponding to file 7 (254) is stored in dinode 7 (234), while the corresponding extended attribute data is stored in dinodex 7 (214). If the extended attributes do not fit in the space available in dinodex 7 (214), then additional outline pages (outline 1 (279), outline 2 (280), and outline 3. (281) are used to store extended attribute data in addition to the inline space available in dinodex 7 (214).

Finally, system data corresponding to file 8 (256) is stored in dinode 8 (236), while the corresponding extended attribute data is stored in dinodex 8 (216). If the extended attributes do not fit in the space available in dinodex 8 (216), then additional outline pages (outline 1 (282), outline 2 (283), and outline 3 (284) are used to store extended attribute data in addition to the inline space available in dinodex 8 (216).

Figure 3:
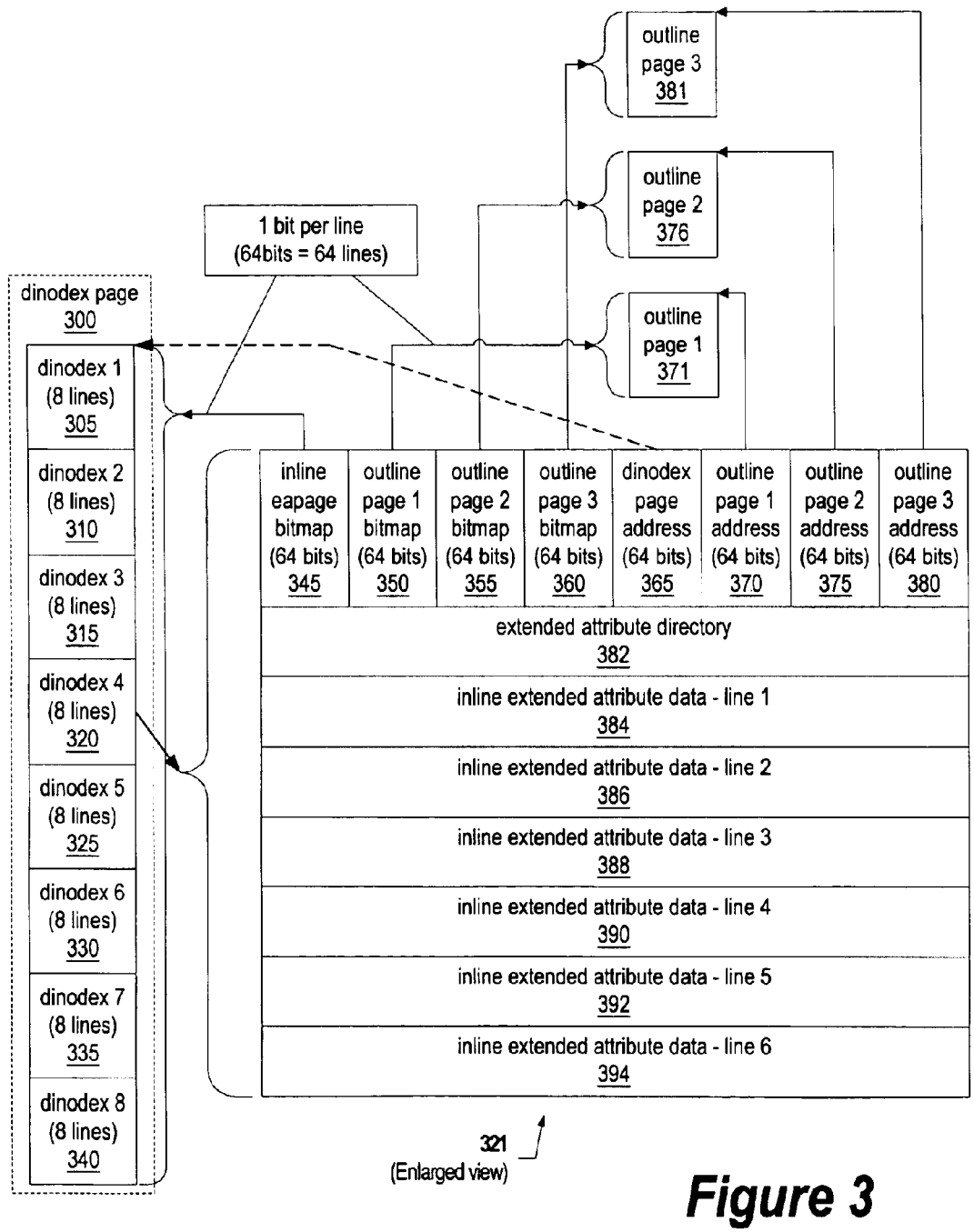
FIG. 3 is a diagram of an extended attribute page and details of data pertaining to one of the files.

FIG. 3 shows a diagram of an extended attribute page and details of data pertaining to one of the files. Dinodex page 300 is shown with eight data areas (dinodex 1 (305), dinodex 2 (310), dinodex 3 (315), dinodex 4 (320), dinodex 5 (325), dinodex 6 (330), dinodex 7 (335), and dinodex 8 (340)) corresponding to eight files. Each of the dinodex data areas is eight lines long and 512 bits (64 bytes) wide. Dinodex 4 (320) is shown enlarged (enlarged dinodex 321) to illustrate the data areas within a dinodex.

The first line of a dinodex data area is used to store various addresses and bitmaps used to manage the extended attribute space. The second line of a dinodex data area is used to store directory information pertaining to the stored extended attribute data. Extended attribute directory 382 includes information such as the extended attribute field name provided by the application storing the extended attribute data. In addition, the actual length of the data is stored along with an offset (in lines) within the extended attribute data so that the data can be retrieved by using the offset to determine the first line to retrieve and using the actual size to determine the number of 512 bit lines to retrieve.

Returning to the first line of a dinodex data area, as previously discussed, this line is used to store various addresses and bitmaps used to manage the extended attribute (dinodex) space. The first field, inline eapage bitmap 345, is 64 bits wide one bit corresponding to each line in dinodex page 300. Because there are eight lines in each dinodex area and each area is eight lines long, there are 64 bits used to represent the lines in the data area. When initializing inline eapage bitmap 345, all bits for dinodex data areas other than dinodex 4 (320) are flagged as already used. In addition, the first two lines of dinodex 4 are already in use (the first line is used to store the bitmap and addressing information, the second line used to store extended attribute directory information), so these lines are flagged as being already used as well. The remaining six lines (inline extended attribute data line 1 (384), inline extended attribute data line 2 (386), inline extended attribute data line 3 (388), inline extended attribute data line 4 (390), inline extended attribute data line 5 (392), and inline extended attribute data line 6 (394)), are available for use by the file corresponding to dinodex 4 (320), so bits corresponding to these lines are cleared to indicate that these six lines are available to store extended attribute data. When extended attribute data is stored in these lines, the corresponding bits will be flagged to indicate that the lines are already in use. Thus, the inline data area is able to store 384 bytes of data (64 bytes per line×6 lines=384 bytes).

The second, third, and fourth fields (outline page 1 bitmap 350, outline page 2 bitmap 355, and outline page 3 bitmap 360) are each used to store a bitmap for corresponding outline pages (outline page 1 371, outline page 2 372, and outline page 3 373). Each outline page contains 64 lines and each line can store 512 bits (64 bytes) of data. Therefore, each outline page is able to store 4,096 bytes (4K) of data. When a line in an outline page is used to store data, the corresponding bit in the corresponding bitmap is flagged to indicate that the line is being used.

The remaining four fields each contain a 64 bit address. The first field, dinodex page address 365, is used to store the address for the dinodex page to which this dinodex data area belongs. The second, third, and fourth fields (outline page 1 address 370, outline page 2 address 375, and outline page 3 address 380) are each used to store an address to the corresponding outline page (outline page 1 371, outline page 2 372, and outline page 3 373)

The bitmaps stored in the dinodex data area are used to determine exactly where extended attribute space is available for a given file. If space is available within the dinodex data area it is stored in the dinodex data area ("inline"), otherwise an outline page is identified with available space and the page is retrieve using the corresponding outline page address.

FIG. 4 shows a set of inline page bitmaps upon initialization and a format for an outline extended attribute page along with its initial page map.

Dinodex 1 inline page map (405) is shown with the first eight bits representing the dinodex 1 data area. This bitmap would be stored in the inline eapage bitmap included with the dinodex data area (see FIG. 3, inline eapage bitmap 345). Of these eight bits, the first two are flagged ("1") indicating that the lines are in use because the first two lines are used to store the dinodex bitmaps (line 1) and the extended attribute directory (line 2). The next six bits are shown as available ("0") for storing extended attribute data. The remaining 56 bits are flagged indicating that the lines are in use because they are used by other dinodex data areas (areas 2 through 8).

Similarly, the bitmaps for the other dinodex data areas (bitmaps 410, 415, 420, 425, 430, 435, and 440) indicate which bits are available by their respective data areas. Notice how the available bits shift from one bitmap to the next, with available bits being the $3^{rd}$ through $8^{th}$ bits in bitmap 405, the $11^{th}$ through $16^{th}$ in bitmap 410, and so on until the available bits are the $59^{th}$ through the $64^{th}$ in bitmap 440.

Outline page 450 shows an outline page and outline bitmap 455 shows the bitmap corresponding to outline page 450 upon creation, or initialization, of the corresponding dinodex data area. Outline page 450 includes 64 lines for storing extended attribute data with each line being able to store 512 bits (64 bytes). Upon initialization, outline bitmap 455 is shown with every line in outline page 450 being available ("0"). Whenever a line of outline page 450 is used to store extended attribute data, the corresponding bit in bitmap 455 is flagged ("1") indicating that the line is already in use.

Figure 5:
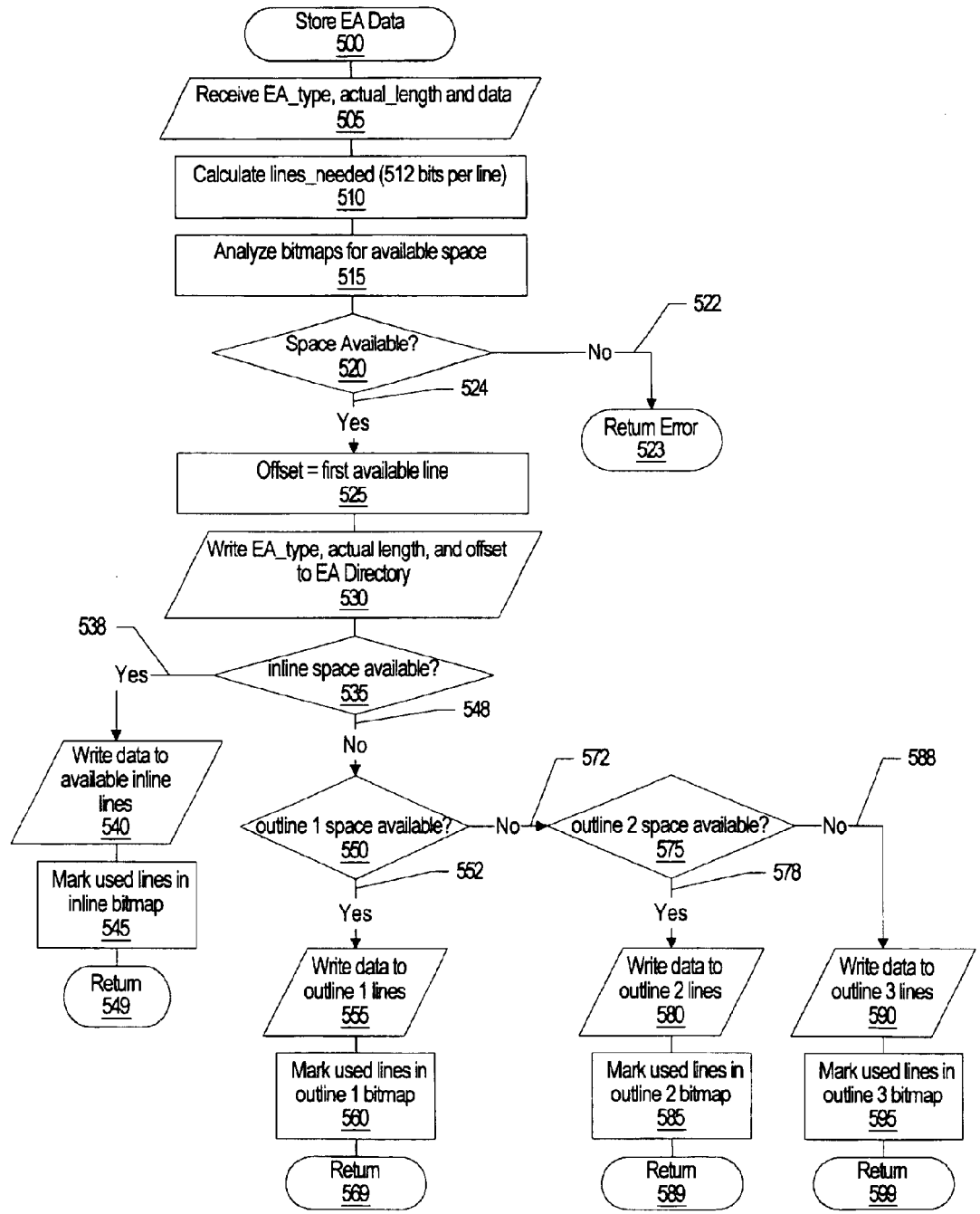
FIG. 5 is a flowchart showing the details involved in storing extended attribute data.

FIG. 5 shows a flowchart showing the details involved in storing extended attribute data. Processing commences at 500 whereupon an extended attribute storage request is received (input 505). The extended attribute storage request includes the extended attribute data that the application or user is requested be stored, along with a name associated with the extended attribute data (EA_type), and an actual length corresponding to the data. Alternatively, the actual length can be calculated by analyzing the received data. The number of 512 bit (64 byte) lines needed to store the data is calculated based on the actual length of the data (step 510). Each EA_type begins on a new line, so if the data does not fill the last line needed, the extra bytes on the last line are unused. The bitmaps stored in the dinodex data area (inline bitmap, outline 1 bitmap, outline 2 bitmap, and outline 3 bitmap) are analyzed to determine if sufficient space exists to store the data (step 515). A determination is made as to whether space exists to store the data (decision 520). If there is not enough space to store the data, decision 520 branches to "no" branch 522 whereupon an error is returned to the requesting process (return error 523) indicating that there is insufficient extended attribute space to satisfy the request.

On the other hand, if space is available, decision 520 branches to "yes" branch 524 whereupon an offset is determined by the number of the first available line that will be used to store the data. In one embodiment, the offset includes the page that is used to store the data (inline, outline 1, 2, or 3) is included along with the offset from the beginning of the chosen page. In another embodiment, the offset indicates the line position as if the inline dinodex page and the outline pages were in a contiguous area with the actual page determined by analyzing the offset number (the first 64 lines included in the dinodex page, the next 64 lines included in outline page 1, the next 64 lines included in outline page 2, and the last 64 lines included in outline page 3), so that an offset of "66" would indicate the second line in outline page 1.

The EA_type, actual length of the data, and offset are stored (output 530) in the EA directory (see FIG. 3, extended attribute directory 382 for details about the EA directory). Analyzing inline bitmap (see FIG. 3, inline eapage bitmap 345 for details about this bitmap) determines whether space is available in the inline data area (decision 535). If inline space is available, decision 535 branches to "yes" branch 538 whereupon the data is written to one or more lines (up to 6 lines total) in the inline data area (step 540). The corresponding bits in the inline bitmap are also flagged as being used (step 545) before processing returns at 549.

If inline space is not available, decision 535 branches to "no" branch 548. Analyzing outline 1 bitmap (see FIG. 3, outline 1 bitmap 350 for details about this bitmap) determines whether space is available in the outline page 1 (decision 550). If outline page 1 space is available, decision 550 branches to "yes" branch 552 whereupon the data is written to one or more outline page 1 lines (output 555). The corresponding bits in the outline 1 bitmap are flagged as being used (step 560) before processing returns at 569.

If outline page 1 space is not available, decision 550 branches to "no" branch 572. Analyzing outline 2 bitmap (see FIG. 3, outline 1 bitmap 355 for details about this bitmap) determines whether space is available in the outline page 2 data area (decision 575). If outline page 2 space is available, decision 575 branches to "yes" branch 578 whereupon the data is written to one or more outline page 2 lines (output 580). The corresponding bits in the outline 2 bitmap are flagged as being used (step 585) before processing returns at 589.

Finally, if outline page 2 space is not available, decision 575 branches to "no" branch 588 whereupon the data is written to one or more outline page 3 lines (output 590) and the corresponding bits in the outline 3 bitmap are flagged as being used (step 595) before processing returns at 599.

Figure 6:
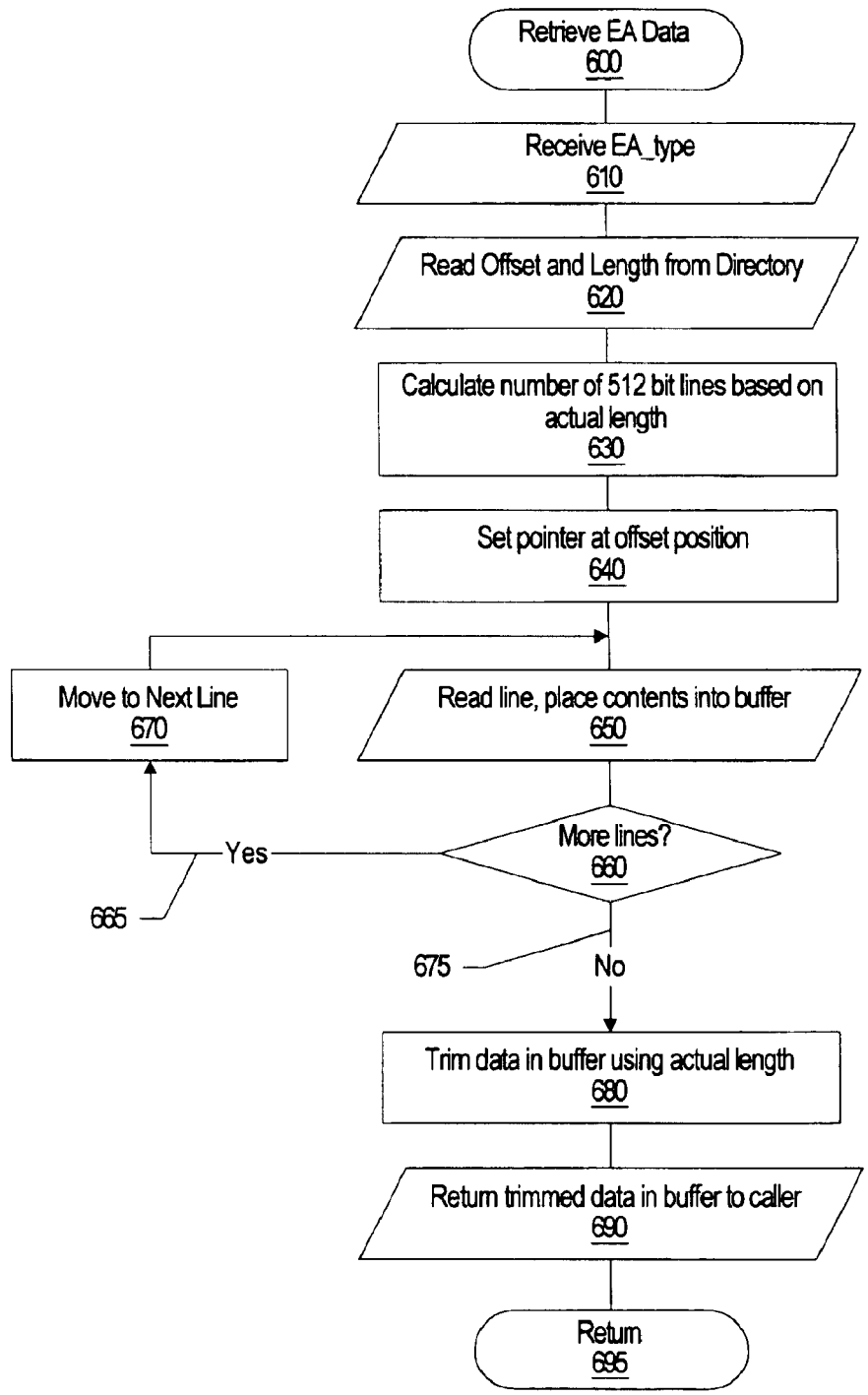
FIG. 6 is a flowchart showing the details involved in retrieving extended attribute data.

FIG. 6 shows a flowchart showing the details involved in retrieving extended attribute data. Processing commences at 600 whereupon a retrieval request is received for an extended attribute type stored in the extended data (input 610). The extended attribute type is used to find the offset and actual length from the extended attribute directory (input 620). The number of 512 bit lines that need to be read is calculated based on the actual length field retrieved from the extended attribute directory (step 630). A pointer is set at the offset position found in the extended attribute directory (step 640). In one embodiment, the offset is divided by 64 with the integer quotient providing the page upon which the data is stored and the remainder providing the line number within the page where the data begins. The contents of the line are read and placed into a buffer (input/output 650). A determination is made based on the calculated number of lines whether more lines need to be read (decision 660). If more lines need to be read, decision 660 branches to "yes" branch 665 and the pointer is moved to the next line (step 670) and processing loops back to read the next line and append its contents to the contents already in the buffer (input/output 650). This looping continues until all lines corresponding to the extended attribute type have been read and placed into the buffer at which point decision 660 determines that no more lines need to be read and branches to "no" branch 675. The data in the buffer was placed in the buffer in 512 bit chunks and this amount may be more than the actual amount of stored as extended attribute data. The buffer is therefore trimmed to remove any excess data at the end of the buffer (step 680). The trimmed buffer is returned to the caller (step 690) for processing by an application or other process using the extended attribute data. The retrieve extended attribute data processing ends at 695.

Figure 7:
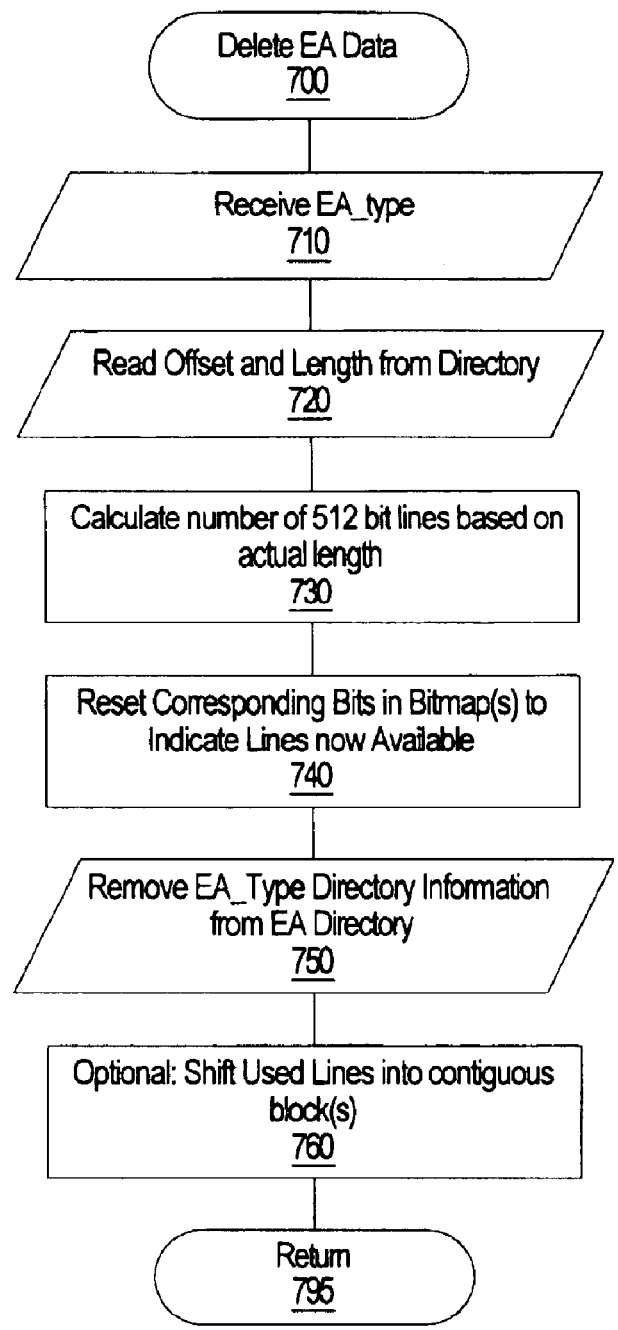
FIG. 7 is a flowchart showing the details involved in deleting extended attribute data.

FIG. 7 shows a flowchart showing the details involved in deleting extended attribute data. Processing commences at 700 whereupon a delete request is received for an extended attribute type stored as extended data (input 710). The extended attribute type is used to find the offset and actual length from the extended attribute directory (input 720). The number of 512 bit lines that need to be marked as available (i.e., deleted) is calculated based on the actual length field retrieved from the extended attribute directory (step 730). The bits in the bitmap corresponding to the extended attribute data are reset as available ("0") so that the space may be used to store other extended attribute data (step 740). Finally, the extended attribute type information is removed from the extended attribute directory to make room for other extended attribute type entries (output 750). In one embodiment, the bits in the bitmaps are marked as available and no additional processing is performed to defragment the lines within the pages used to store the extended attribute data. In another embodiment, used lines within a page are moved to defragment the page to make room for larger extended attribute types (optional step 760). Defragmenting the extended attribute pages could also be performed at a later time when demand for computer resources is lower. The delete extended attribute data processing ends at 695.

Figure 8:
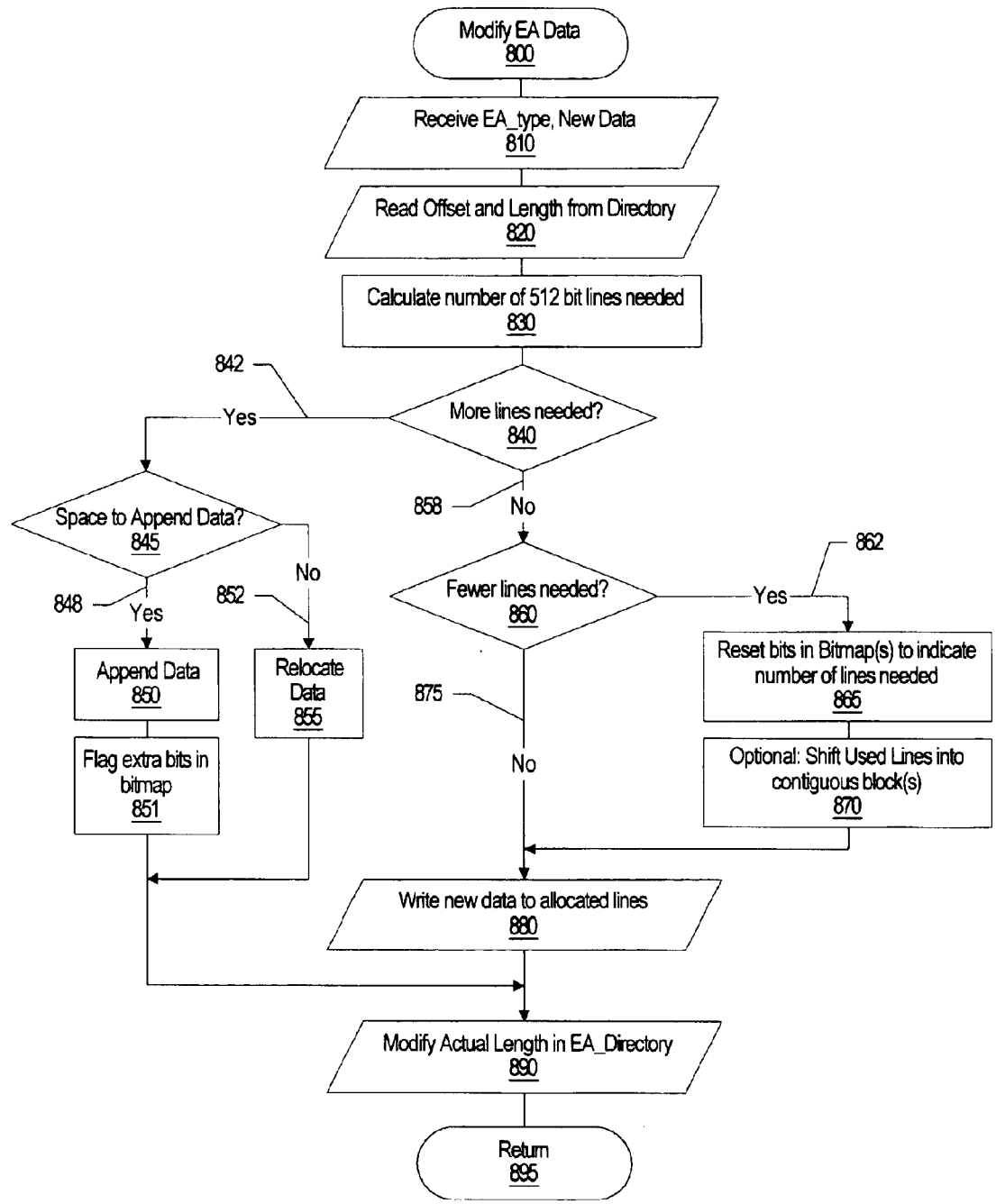
FIG. 8 is a flowchart showing the details involved in modifying extended attribute data.

FIG. 8 shows a flowchart showing the details involved in modifying extended attribute data. Processing commences at 800 whereupon a modification request is received for an extended attribute type stored in the extended data (input 810). The modification request includes the name of the extended attribute type being modified and the modified extended attribute data corresponding to the type. The extended attribute type is used to find the offset and actual length from the extended attribute directory (input 820). The number of 512 bit lines that currently exist for the extended attribute type is calculated based on the actual length field retrieved from the extended attribute directory (step 830). A determination is made by comparing the number of lines currently being used to store the extended attribute type data with the number of lines needed to store the new data received at input 810 (decision 840). If more lines are needed to store the data, decision 840 branches to "yes" branch 842. A second decision is made whether the current page used to store the data (inline, outline 1, 2 or 3) has enough empty lines after the currently stored data to append the additional data (decision 845). If enough empty lines follow the currently used lines, decision 845 branches to "yes" branch 848 whereupon additional lines within the page are used to store the data (step 850) and additional bits in the bitmap are flagged to indicate the additional lines being used (step 851). On the other hand, if there are not enough empty lines after the currently stored data to append the additional data, decision 845 branches to "no" branch 852 whereupon the data is relocated to another place (step 855) on either the current page or another page. Relocation involves deleting the currently allocated space (see FIG. 7) and adding the data to a another place on either the current page or another page (see FIG. 5).

Returning to decision 840, if more lines are not needed, decision 840 branches to "no" branch 85B. Another decision is made to determine if fewer lines are needed (decision 860). If fewer lines are needed, decision 860 branches to "yes" branch 862 whereupon the corresponding end bits are reset to show that the lines are available (step 865). In one embodiment, the bits in the bitmaps are marked as available and no additional processing is performed to defragment the lines within the page used to store the extended attribute data. In another embodiment, used lines within a page are moved to defragment the page and make room for larger extended attribute types (optional step 870). If fewer lines are not needed, decision 860 branches to "no" branch 875. If more lines are not needed (decision 840 branched to "no" branch 858), the modified extended attribute data received at 810 is written to the allocated lines (output 880).

Finally, the actual length field in the extended attribute directory is modified to reflect the new size of the extended attribute data corresponding with the EA_type. Processing of the extended attribute data modification ends at 895.

Figure 9:
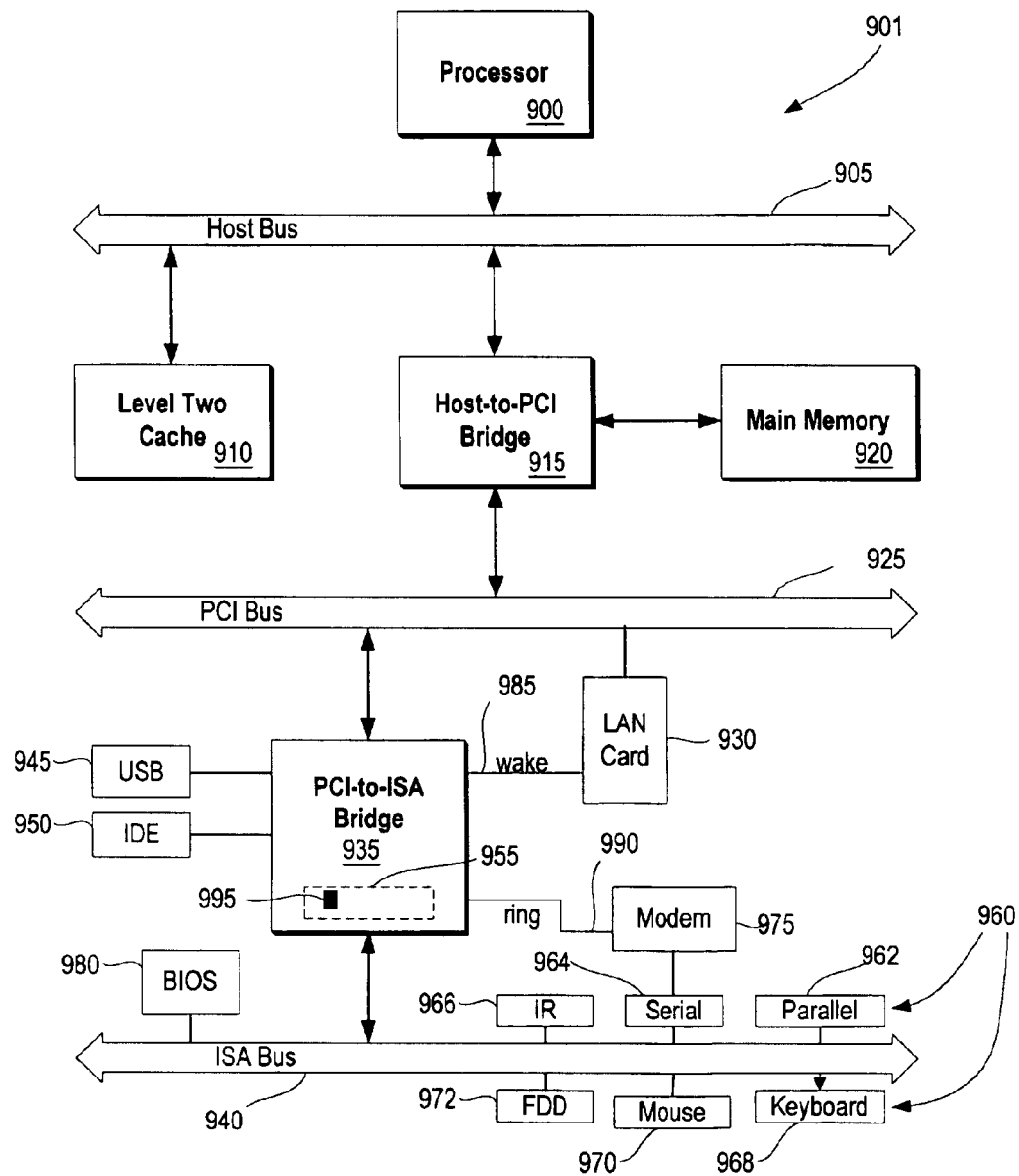
FIG. 9 is a block diagram of an information handling system capable of performing the present invention.

FIG. 9 illustrates information handling system 901 which is a simplified example of a computer system capable of performing the copy processing described herein. Computer system 901 includes processor 900 which is coupled to host bus 905. A level two (L2) cache memory 910 is also coupled to the host bus 905. Host-to-PCI bridge 915 is coupled to main memory 920, includes cache memory and main memory control functions, and provides bus control to handle transfers among PCI bus 925, processor 900, L2 cache 910, main memory 920, and host bus 905. PCI bus 925 provides an interface for a variety of devices including, for example, LAN card 930. PCI-to-ISA bridge 935 provides bus control to handle transfers between PCI bus 925 and ISA bus 940, universal serial bus (USB) functionality 945, IDE device functionality 950, power management functionality 955, and can include other functional elements not shown, such as a real-time clock (RTC), DMA control, interrupt support, and system management bus support. Peripheral devices and input/output (I/O) devices can be attached to various interfaces 960 (e.g., parallel interface 962, serial interface 964, infrared (IR) interface 966, keyboard interface 968, mouse interface 970, and fixed disk (FDD) 972) coupled to ISA bus 940. Alternatively, many I/O devices can be accommodated by a super I/O controller (not shown) attached to ISA bus 940.

BIOS 980 is coupled to ISA bus 940, and incorporates the necessary processor executable code for a variety of low-level system functions and system boot functions. BIOS 980 can be stored in any computer readable medium, including magnetic storage media, optical storage media, flash memory, random access memory, read only memory, and communications media conveying signals encoding the instructions (e.g., signals from a network). In order to attach computer system 901 another computer system to copy files over a network, LAN card 930 is coupled to PCI-to-ISA bridge 935. Similarly, to connect computer system 901 to an ISP to connect to the Internet using a telephone line connection, modem 975 is connected to serial port 964 and PCI-to-ISA Bridge 935.

While the computer system described in FIG. 9 is capable of executing the copying processes described herein, this computer system is simply one example of a computer system. Those skilled in the art will appreciate that many other computer system designs are capable of performing the copying process described herein.

One of the preferred implementations of the invention is a client application, namely, a set of instructions (program code) in a code module which may, for example, be resident in the random access memory of the computer. Until required by the computer, the set of instructions may be stored in another computer memory, for example, in a hard disk drive, or in a removable memory such as an optical disk (for eventual use in a CD ROM) or floppy disk (for eventual use in a floppy disk drive), or downloaded via the Internet or other computer network. Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those with skill in the art that is a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A method for managing extended attribute data, said method comprising:
   identifying a data area in a data space to store attribute data, wherein the data space includes an inline page and one or more outline pages;
   storing the attribute data in the identified data area; and
   marking one or more bits in a bitmap corresponding to the data space, wherein the marked bits correspond to the identified data area.

2. The method as described in claim 1 further comprising:
   storing an extended attribute type, a size, and an offset in an extended attribute directory.

3. The method as described in claim 1 wherein the inline page and the outline pages each have a corresponding bitmap.

4. The method as described in claim 1 further comprising:
   receiving an extended attribute type and the attribute data;
   calculating a number of lines needed to store the attribute data in the data space, wherein the data space includes an inline space and one or more outline spaces;
   analyzing a bitmap corresponding with the inline space to determine whether the calculated number of lines are available in the inline space to store the attribute data; and
   storing the attribute data in one or more lines included in the inline space in response to the analysis determining that the number of lines are available.

5. The method as described in claim 4, wherein the data space includes one or more outline data spaces, the method further comprising:

analyzing one or more outline bitmaps, each of the outline bitmaps corresponding with one of the outline data spaces, to determine whether the calculated number of lines are available in any of the outline spaces to store the attribute data; and storing the attribute data in one or more lines included in at least one of the outline spaces in response to the analysis of outline bitmaps determining that the number of lines are available in at least one outline data space.

6. The method as described in claim 1 further comprising:

receiving a retrieval request from a requestor for an attribute stored in the data space;

identifying an offset and a length in an extended attribute directory corresponding to the requested attribute;

calculating a number of lines based on the identified length;

retrieving the calculated number of lines from the data space beginning at the offset; and providing the calculated number of lines to the requestor.

7. The method as described in claim 6 further comprising:

calculating a last line length corresponding to a last line retrieved based on the length; and truncating the last line based on the last line length prior to the providing.

8. The method as described in claim 1 further comprising:

receiving a deletion request for an attribute stored in the data space;

locating an attribute offset and an attribute length in an attribute directory corresponding to the deletion request;

calculating a number of lines based on the attribute length;

identifying a stored data area based on the attribute offset and the calculated number of lines;

resetting one or more bits corresponding to the identified stored data area in the bitmap, wherein the resetting indicates that the corresponding data area is available for storing of a new attribute.

9. The method as described in claim 1 further comprising:

receiving a modification request for an attribute stored in the data space, the request including a modified attribute data;

locating an attribute offset and an attribute length in an attribute directory corresponding to the modification request;

calculating a stored number of lines based on the attribute length and a needed number of lines based on the modified attribute data;

identifying a current storage location within the data space based on the attribute offset and stored number of lines;

comparing the stored number of lines with the needed number of lines, in response to the comparing:

replacing the stored attribute data with the modified attribute data in the identified current storage location in response to the stored number of lines equaling the needed number of lines:

resetting one or more bits corresponding to the identified current storage location in the bitmap, wherein the resetting indicates that the corresponding data area is available for storing of a new attribute, in response to the stored number of lines being greater than the needed number of lines;

relocating the modified attribute data to a different data area response to the stored number of lines being less than the needed number of lines and determining that there is an insufficient number of unused lines following the current storage location to store the modified attribute data; and appending the modified attribute data to one or more lines following the current storage location in response to the stored number of lines being less than the needed number of lines and determining that there are a sufficient number of unused lines following the current storage location to store the modified attribute data.

10. A computer program product for managing extended attribute data, said computer program product comprising:

means for identifying a data area in a data space to store attribute data, wherein the data space includes an inline page and one or more outline pages;

means for storing the attribute data in the identified data area; and means for marking one or more bits in a bitmap corresponding to the data space, wherein the marked bits correspond to the identified data area.

11. The computer program product as described in claim 10 further comprising:

means for storing an extended attribute type, a size, and an offset in an extended attribute directory.

12. The computer program product as described in claim 10, wherein the inline page and the outline pages each have a corresponding bitmap.

13. The computer program product as described in claim 10 further comprising:

means for receiving a retrieval request from a requester for an attribute stored in the data space;

means for identifying an offset and a length in an extended attribute directory corresponding to the requested attribute;

means for calculating a number of lines based on the identified length;

means for retrieving the calculated number of lines from the data space beginning at the offset; and means for providing the calculated number of lines to the requester.

14. The computer program product as described in claim 13 further comprising:

means for calculating a last line length corresponding to a last line retrieved based on the length; and means for truncating the last line based on the last line length prior to the providing.

15. The computer program product as described in claim 10 further comprising:

means for receiving a deletion request for an attribute stored in the data space;

means for locating an attribute offset and an attribute length in an attribute directory corresponding to the deletion request;

means for calculating a number of lines based on the attribute length;

means for identifying a stored data area based on the attribute offset and the calculated number of lines;

means for resetting one or more bits corresponding to the identified stored data area in the bitmap, wherein the resetting indicates that the corresponding data area is available for storing of a new attribute.

16. The computer program product as described in claim 10 further comprising:

means for receiving a modification request for an attribute stored in the data space, the request including a modified attribute data;

means for locating an attribute offset and an attribute length in an attribute directory corresponding to the modification request;

means for calculating a stored number of lines based on the attribute length and a needed number of lines based on the modified attribute data;

means for identifying a current storage location within the data space based on the attribute offset and stored number of lines;

means for comparing the stored number of lines with the needed number of lines;

in response to the comparing:

means for replacing the stored attribute data with the modified attribute data in the identified current storage location in response to the stored number of lines equaling the needed number of lines;

means for resetting one or more bits corresponding to the identified current storage location in the bitmap, wherein the resetting indicates that the corresponding data area is available for storing of a new attribute, in response to the stored number of lines being greater than the needed number of lines;

means for relocating the modified attribute data to a different data area response to the stored number of lines being less than the needed number of lines and determining that there is an insufficient number of unused lines following the current storage location to store the modified attribute data; and means for appending the modified attribute data to one or more lines following the current storage location in response to the stored number of lines being less than the needed number of lines and determining that there are a sufficient number of unused lines following the current storage location to store the modified attribute data.

17. The computer program product as described in claim 10 further comprising:

means for receiving an extended attribute type and the attribute data;

means for calculating a number of lines needed to store the attribute data in the data space, wherein the data space includes an inline space and one or more outline spaces;

means for analyzing a bitmap corresponding with the inline space to determine whether the calculated number of lines are available in the inline space to store the attribute data; and means for storing the attribute data in one or more lines included in the inline space in response to the analysis determining that the number of lines are available.

18. The computer program product as described in claim 17, wherein the data space includes one or more outline data spaces, the computer program product further comprising:

means for analyzing one or more outline bitmaps, each of the outline bitmaps corresponding with one of the outline data spaces, to determine whether the calculated number of lines are available in any of the outline spaces to store the attribute data; and means for storing the attribute data in one or more lines included in at least one of the outline spaces in response to the analysis of outline bitmaps determining that the number of lines are available in at least one outline data space.

* * * * *

UNITED STATES PATENT AND TRADEMARK OFFICE
CERTIFICATE OF CORRECTION

PATENT NO. : 6,850,929 B2
APPLICATION NO. : 09/801605
DATED : February 1, 2005
INVENTOR(S) : Chang et al.

It is certified that error appears in the above-identified patent and that said Letters Patent is hereby corrected as shown below:

Column 9, line 6, please delete "85B" and insert --858--.

Claim 8, column 11, line 39, please delete "lines;" and insert --lines; and--

Claim 9, column 11, line 59, please delete "number of lines, in response to the comparing:" and insert --number of lines; in response to the comparing:--

Claim 9, column 11, line 63, please delete "lines:" and insert --lines;--

Claim 9, column 12, lines 4, please delete "area response" and insert --area in response--

Claim 15, column 12, line 63, please delete "lines;" and insert --lines; and--

Signed and Sealed this

Fourth Day of September, 2007

JON W. DUDAS
*Director of the United States Patent and Trademark Office*